United States Patent
Glastra

[15] 3,662,637
[45] May 16, 1972

[54] DEVICE FOR CUTTING PLATE MATERIAL

[72] Inventor: Hendrik Glastra, Enschede, Netherlands

[73] Assignee: N.V. Maatschappij voor Industriele Research en Ontwikkeling, Enschede, Netherlands

[22] Filed: Mar. 19, 1970

[21] Appl. No.: 20,980

[52] U.S. Cl. .............................................83/201.15, 83/661
[51] Int. Cl. ..........................................................B23d 55/08
[58] Field of Search .............................83/174, 201–201.15, 83/661, 925 CC; 143/133–134

[56] References Cited

UNITED STATES PATENTS

| 2,843,917 | 7/1958 | Crane et al. | 83/201.07 |
| 3,395,595 | 8/1968 | Braun et al. | 83/174 |

FOREIGN PATENTS OR APPLICATIONS

| 41,720 | 11/1907 | Switzerland | 83/661 |

Primary Examiner—James M. Meister
Attorney—Woodhams, Blanchard and Flynn

[57] ABSTRACT

Cutting machine for plate material with a loop of cutting wire, which is driven in the circumferential direction, and has a cross-section which is substantially equilaterally triangular, while furthermore suitable drive means impart to the wire a movement around its center line.

8 Claims, 9 Drawing Figures

PATENTED MAY 16 1972 3,662,637

INVENTOR
HENDRIK GLASTRA
BY
Woodhams, Blenhard & Flynn
ATTORNEYS

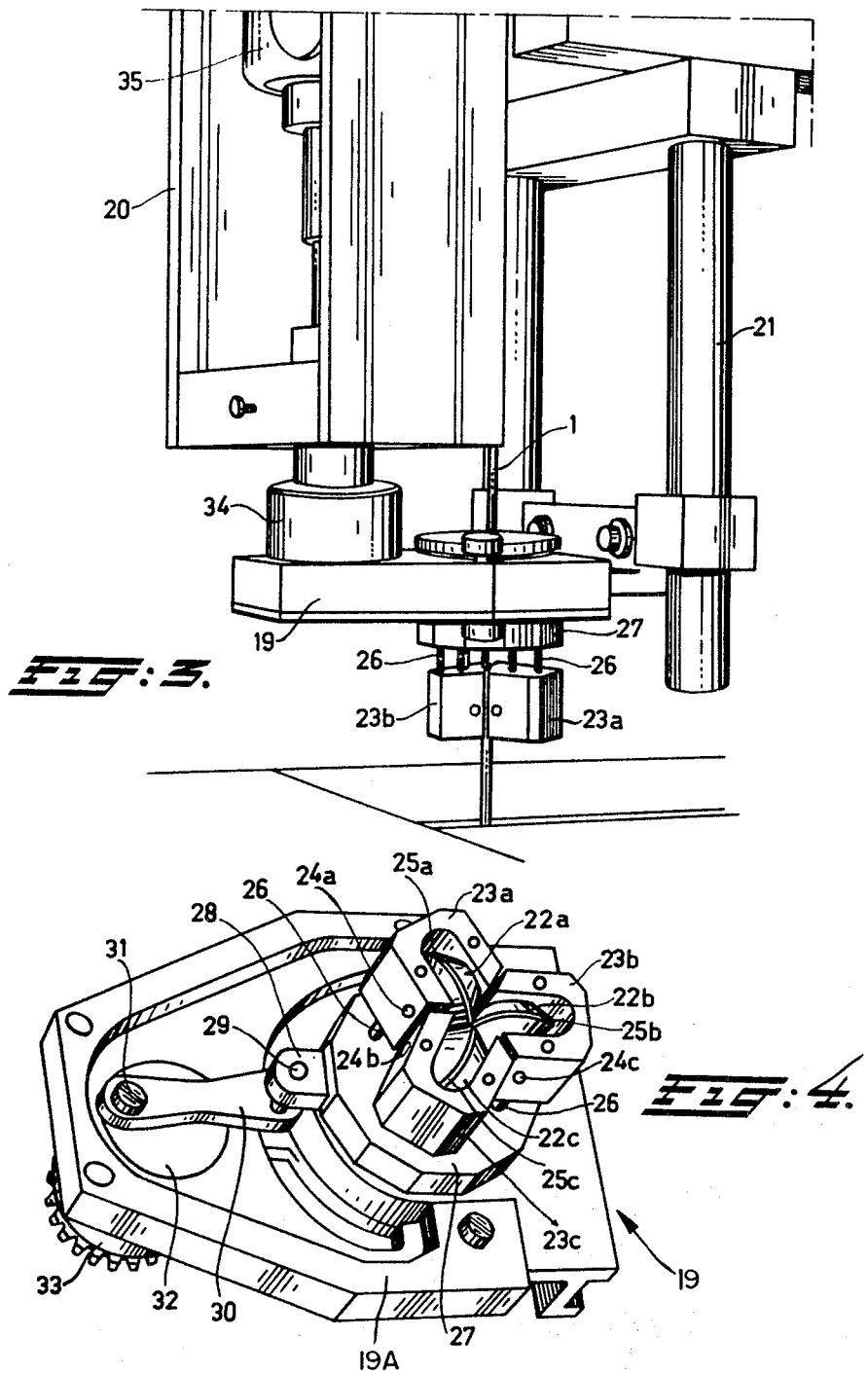

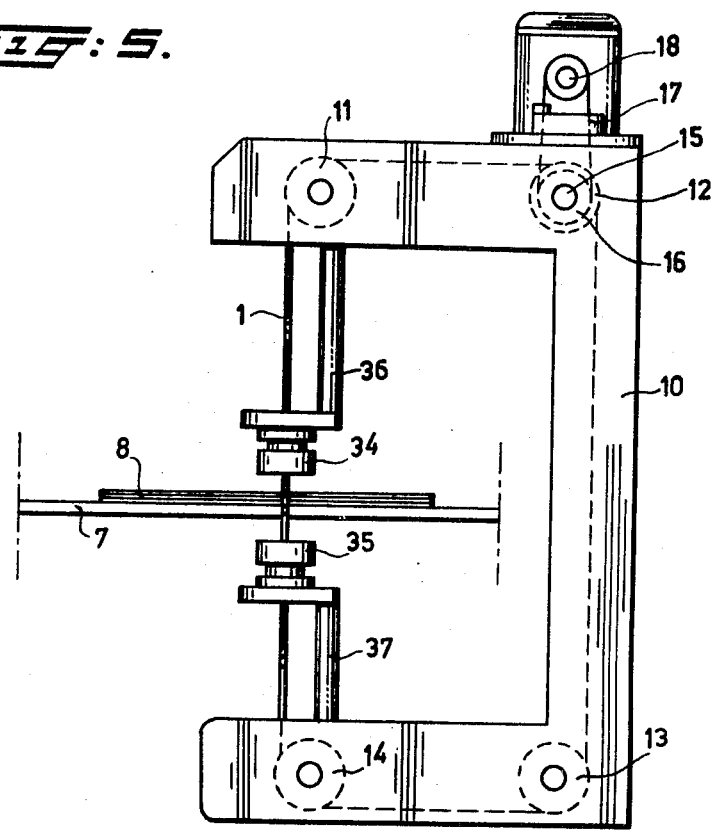
FIG:5.
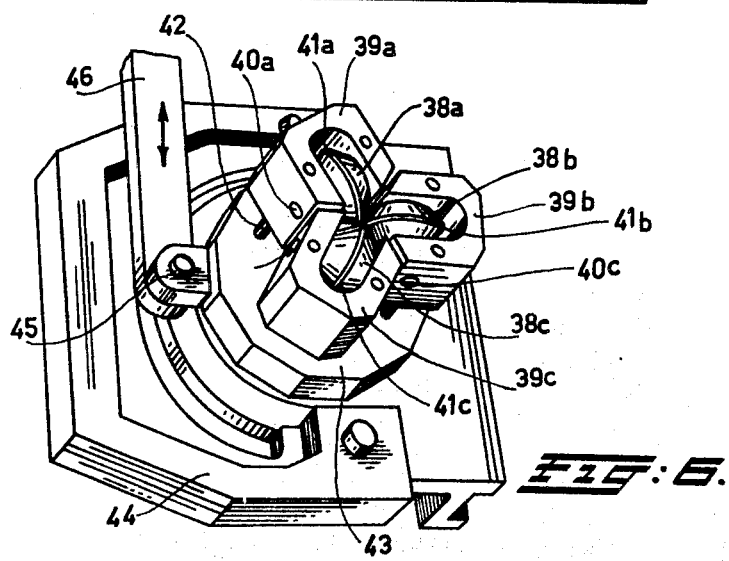
FIG:6.
INVENTOR
HENDRIK GLASTRA
BY
Woodhams, Blenhard & Flynn
ATTORNEYS

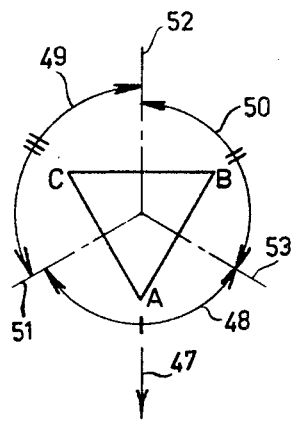
FIG: 7a.
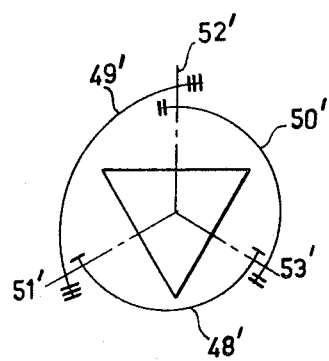
FIG: 7b.
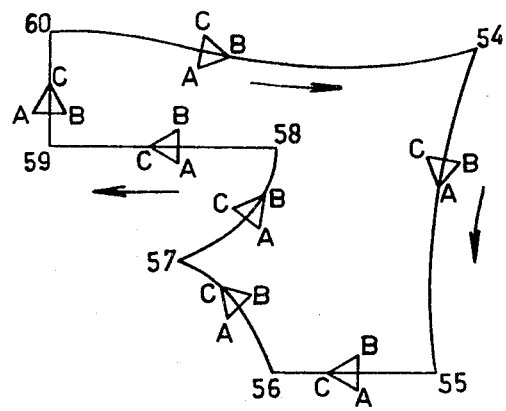
FIG: 8.
INVENTOR
HENDRIK GLASTRA
BY
Woodhams, Blanchard & Flynn
ATTORNEYS

DEVICE FOR CUTTING PLATE MATERIAL

BACKGROUND OF THE INVENTION

Devices for cutting plate material are particularly used for cutting layers of textile and the like. They usually comprise a support for the material and a loop of cutting wire of which a part is substantially perpendicular to the material and movable with respect thereto, to follow a particular pattern. The wire is mostly guided on guide rollers which are situated on either side of the material and driven in the circumferential direction.

Such cutting devices are, for instance, used for cutting a number of layers of textile material at one time. Following the pattern of the dresses to be made from said material the cutting wire severs the material. The invention provides a cutting machine with which natural fibers as well as synthetic fibers can be cut with a high speed.

DESCRIPTION OF THE PRIOR ART

Cutting devices are known per se. These known cutting devices use a curved cutting wire which, like a ribbon saw, cuts through the material. The cutting wire is sometimes a wire with a square cross section which is twisted a number of turns resulting in a number of helically extending cutting edges with grooves situated therein between. One also uses cutting wire which consists of a cylindrical core with a thinner wire which is helically wound around the core.

These known cutting devices have the drawback that, when used for cutting synthetic fibers, the grooves in the cutting wire clog up, after a rather short time, with material which cannot be removed. The cutting wire is very soon unfit for further use. Moreover in a square wire, twisted for many turns, stresses are generated in the material of the wire which result in premature fracture; in a cylindrical wire with a thin wire wound therearound this phenomenon does not occur, but the manufacture of such wire is expensive.

SUMMARY OF THE INVENTION

It is an object of the invention to overcome these difficulties. The cutting device according to the invention is provided with a wire which has a cross-section which is substantially an equilaterally triangular, the wire being passed between the guide rollers through a coaxial guide member which, by means of suitable drive means, is driven in such a way that it performs a movement around its center line. This movement is preferably an oscillatory movement.

Due to this feature an excellent cutting effect is obtained whereby on cutting textile the edges of the material cut are hardly or not at all, frayed. Particularly due to the quick oscillatory movement of the cutting wire, the rayon cannot adhere to the cutting wire; should an adherence nevertheless occur, then a grindstone arranged in the vicinity of one of the guide rollers and along which the wire is guided, suffices to clean the surface of the wire.

Preferably the maximum deviation from the symmetry position is 60°.

In a preferred embodiment the wire is guided between the flat peripheric faces of three guide rollers the axes of which, perpendicular to the wire, include an angle of 60° between them, the guide rollers each being supported in a holder which, by means of slightly resiliently yielding pins, is connected to a common carrier, the latter being rotatably supported in a housing and oscillated via an eccentric arm.

According to the invention the guide member can also be driven in such a way that always one of the points of the wire is directed, so as to be tangential to the path to be followed in such a manner that, starting from the position of rest of the wire in which one of the cutting edges is directed in a particular direction, a deviation of the direction of the path from this position of rest over more than substantially 60° to the left or to the right, results in that the cutting edge of the wire, which in the position of rest is situated on the corresponding side, is directed so as to be tangential to the direction of the path.

The use of a three sided cutting wire in combination with the aforementioned feature is advantageous in that for certain required strength of the wire a rather small cross-section of the wire is sufficient, so that it becomes possible to describe very acute angles. The drive as mentioned hereinbefore results in the three available cutting edges of the wire being almost uniformly utilized.

The loop is preferably formed by a wire the ends of which, twisted over one third turn, are interconnected, while the wire is guided along a grinding stone. This ensures that the entire surface of the wire is always uniformly cleaned and that the cutting edges always remain sharp.

The foregoing objects and features of novelty which characterize my invention, as well as other objects, are pointed out with particularity in the claims which form a part of the present specification. For a better understanding of the invention, its features and the specific advantages attained with its use, reference should be had to the accompanying figures and descriptive matter.

BRIEF DESCRIPTION OF THE FIGURES

FIG. 3 shows, on an enlarged scale, a perspective view of the wire guiding member and the drive thereof;

FIG. 4 shows an inverted plan view of the wire guiding member;

FIG. 5 shows an outline a cutting device which a variant of the principle of the invention is used;

FIG. 6 is an inverted plan view of a wire guiding member which is applied therein;

FIGS. 7a and 7b clarify diagrammatically the principle of operation of this embodiment; and FIG. 8 shows diagrammatically the various positions of the cutting wire as a function of the path to be covered.

DETAILED DESCRIPTION

Figure 1:
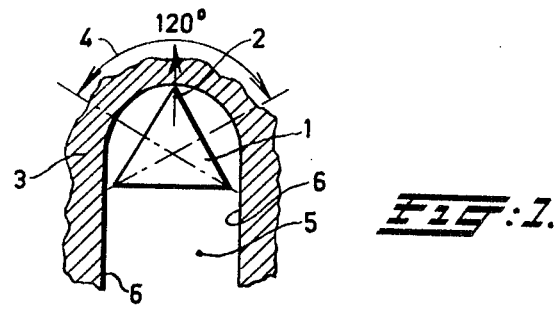
FIG. 1 is a cross-section through a cutting wire according to the invention.

As FIG. 1 shows, the cutting wire 1 has an equilaterally triangular cross-section. When such a wire is moved through the material to be cut, e.g., textile 3, in the direction of the arrow 2 and at the same time also performs an oscillatory movement in the direction of the arrow 4, around its center line and is driven in a direction perpendicular to the plane of the drawing, the fibers will be broken by the three cutting edges and a cut 5 will be made in the material. It has been found that the edges 6 of this cut are hardly or not at all, frayed. The cutting device according to the invention is therefore very well suited to cut layers of textile material with a very great accuracy according to a particular pattern.

When a deviation from the position of rest of 60° to the left and 60° to the right is used, resulting in a total deviation of 120°, the cutting edges of the wire cover a complete cylinder surface.

Figure 2:
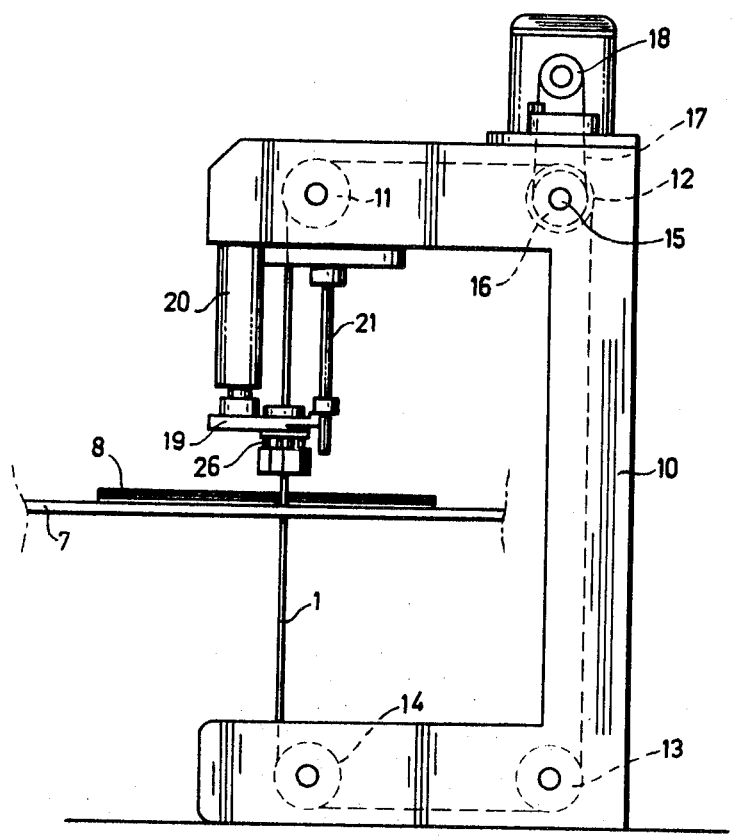
FIG. 2 shows diagrammatically a view of the device according to the invention.

FIG. 2 shows a side view of a part of a cutting device according to the invention. This device comprises a supporting table 7, supporting the material 8 to be cut, in this case a number of layers of textile material. This cutting wire 1 is guided in the frame 10 on rollers 11, 12, 13, 14. The roller 12 may e.g., be coupled to a shaft 15 which also carries a roller 16 which, through a belt 17, is driven by the motor 18.

The frame 10 can be moved by known means (not shown) with respect to the table 7 in two directions which are perpendicular to one another, so that any desired pattern can be cut out from the material 8.

The wire guiding member for the oscillatory drive of the wire on a point close above the surface of the material, is as a whole denoted by the numeral reference 19. The housing 20 secured to the frame, contains a motor for driving this guide member; the rotary movement of its shaft is, by means of a mechanism to be described hereinafter, converted into an oscillatory movement.

The rotating movement can, if wanted, also be obtained from the motor 18. The guide member 19, which further is secured to the rods 21, supported by the frame 10, comprises three rollers 22a, 22b, 22c, which each are accommodated in the holder 23a, 23b, 23c. The shafts 24a, 24b, 24c of the rollers are perpendicular to the wire to be guided between the rollers. The rollers have, as the figure shows, each a cylindrical edge which is situated perpendicularly to the plane of symmetry and the plane of symmetry of rollers includes an angle of 120°. On guiding the wire, the flat edges 25a, 25b and 25c of the respective rollers bear against the sides of the wire.

Each of the holders 23a, 23b, 23c is by means of two slightly resilient pins 26 of hard steel, secured to a common carrier 27 which is rotatably mounted on the guide housing 19A. The whole is adjusted in such a way that, without the wire 1, the distance between the peripheric faces 25a, 25b, 25c is slightly smaller than the section of the wire 1; when the wire is guided in between the rollers, the pins 26 can yield slightly resiliently and a firm pressure is exerted on the wire.

Secured to the carrier 27 is a lip 28 with a pivot pin 29. The end of the latter is rotatably guided in the one end of an eccentric arm 30, the other end of which is driven by the roller 32 through the pivot 31. This roller is coupled to the gear wheel 33 which is driven by the motor 35 in the housing 20 through a suitable transmission in the housing 34.

In operation the disc 32 is driven in rotation while the carrier 27 through the eccentric arm 30 performs an angular oscillatory movement with the desired amplitude, around its center line. Via the holders 23a, 23b, 23c and the rollers 22a, 22b and 22c in the former, the desired oscillatory movement is imparted to the cutting wire 1.

FIG. 5 shows a side view of the cutting device according to FIG. 2, similar reference numerals designating similar parts, but in which another way of driving the cutting wire is used.

Above and beneath the material there is a wire guide member 34, 35, respectively. FIG. 6 shows an under view of one of the wire guiding members. Each wire guiding member is secured to a supporting rod 36, 37, respectively and is constructed in such a way that the wire guided thereinbetween can be rotated over a certain angle around its longitudinal axis.

FIG. 6 shows an under view of such a wire guiding member. It comprises three rollers 38a, 38b and 38c, each accommodated in a holder 39a, 39b and 39c, respectively. The axes 40a, 40b and 40c are perpendicular to the wire guided between the rollers. The rollers each have a cylindrical edge lying perpendicularly to the plane of symmetry and the planes of symmetry of the rollers enclose angles of 120° with respect to each other. When the wire is guided, the flat side 41a, 41b and 41c of the respective rollers rest against the sides of the wire.

Each of the holders 39a, 39b, 39c is by means of two slightly resilient pins 42 of hard steel, secured to a common carrier 43. The whole is dimensioned in such a way that without the wire, the distance between the peripheric surfaces 41a, 41b, 41v is slightly smaller than the dimension of the corresponding cross-section of the wire 1; when the wire is guided in between the rollers, the pins 42 yield resiliently and the wire is firmly pressed.

The common carrier 43 is rotatably supported in the housing 44 and the carrier 43 is provided with a lip 45 which is coupled to a driving rod 46. Due to the movement of the driving rods 46, the angular position of the carrier 43 and therewith the position of the wire guided between the rollers can be changed.

The FIGS. 7a and 7b clarify the principle underlying the invention. It is assumed that the position of rest of the wire 1 is such as is shown in FIG. 7a, the point A being directed in the direction of the arrow 47. When starting from this position of rest, the direction of the tangent to the path to be followed is within the sector 48, which encloses an angle of 120°, the point A of the cutting wire is directed in the direction of the tangent to the path. When the direction of the tangent lies, however, within the sector 49, the point C is brought into the desired direction; when the desired direction lies within the sector 50, the point B is brought into this direction.

All this can be achieved by known electronic means. A typical application of the cutting device according to the invention, is the cutting of layers of textile, using a base pattern which is scanned by a photoelectric scanning head which exactly follows the lines of the pattern, while the frame with the cutting wire is moved in conformity thereto with respect to the fabric, so that the pattern is cut from the fabric. Changes of the direction of the path as wanted, with respect to the starting position can be detected in a simple way and converted into electric control impulses which, through a suitable adjusting mechanism, drive the wire guiding members in such a way that according to the aforementioned rules, the desired cutting angle of the three sided wire is turned in the desired direction.

If this desired direction lies just on the boundary between two sectors, thus in the direction of the lines 51, 52, or 53, it would be possible that the control device alternately turns one or the other cutting edge in this direction (hunting). If the desired direction e.g., lies in the direction of the line 51, the device must select whether the point C or the point A should be conformed to the direction of the line 51.

In order to overcome this trouble, the covered sectors can be selected greater than 120°. FIG. 7b shows this situation; another cutting edge is only then turned forward when the boundary between two sectors has been distinctly crossed. Obviously this is true in the two directions; when the direction of the path to be followed passes from the sector 49' to the sector 48', the cutting edge A will only be turned forward when the boundary 51' has been crossed; when thereupon the direction of the path passes again from the sector 48' to the direction 49', at first the boundary 51' should be crossed again before the cutting edge C is turned in the direction of the path.

FIG. 8 finally shows how, when following a particular path with the angular points 54 to 60, the cutting wire is rotated around its longitudinal axis. After the foregoing description, this Figure is though to be self-explanatory.

Having thus described my invention what is claimed as new and desired to be secured by Letters Patent is:

1. In a device for cutting material, particularly textiles and the like, comprising a support for the material, a loop of cutting wire, part of said loop of cutting wire being substantially perpendicular to the material and movable with respect thereto for following a particular pattern, said wire being guided on guide rolls disposed on opposite sides of the material, one of the guide rolls being driven for causing linear movement of said part of said cutting wire for causing cutting of said material, comprising the improvement wherein the wire has a cross section which is substantially equilaterally triangular, and guide means coacting with said part of said loop of wire for permitting said part to be angularly displaced about its longitudinally extending centerline, said guide means including a guide member mounted for angular movement substantially about said centerline and a plurality of guide rollers rotatably supported on the guide member and disposed for rolling and guiding engagement with said part of said loop of wire, and means interconnected to said guide member for permitting same to be angularly displaced about said centerline for causing a corresponding angular displacement of said part of said loop of wire about its longitudinally extending centerline.

2. A device according to claim 1, wherein there are three said guide rollers, each having a peripheral face disposed in rolling engagement with one of the sides of said wire, each of said three guide rollers being mounted on said guide member for rotation about an axis substantially perpendicular to the centerline of said part of said loop of wire, the rotational axes of adjacent guide rollers defining an included angle of approximately 60° therebetween.

3. A device according to claim 2 wherein said guide member is rotatably supported on a fixed housing for enabling said guide member to be angularly displaced about said centerline, holder means associated with each of said guide rollers for rotatably supporting same, and resilient means coacting between said guide member and each of said holder means for resiliently urging each of said guide rollers into rolling engagement with a respective side surface of said wire.

4. A device according to claim 3, wherein said resilient means comprise resilient pins connected between said guide member and each of said holder means.

5. A device according to claim 3, wherein said means for causing angular movement of said guide member includes drive means for causing angular oscillation of said guide member, which in turn causes angular oscillation of said part of said loop of wire about said longitudinal centerline thereof.

6. A device according to claim 5, wherein said drive means includes a rotatable eccentric and linkage means connected between said eccentric and said guide member for causing angular oscillation of said guide member in response to rotation of said eccentric.

7. A device according to claim 1, wherein said means for permitting angular movement of said guide member includes drive means interconnected to said guide member for causing said part of said loop of wire to be angularly displaceable through a maximum permissible angle of approximately 60° in either direction from a neutral position for causing one of the three cutting edges of the wire to always be directed substantially tangential to the cutting path and for causing one of the other cutting edges to be directed substantially tangential to the cutting path when the path direction deviates more than 60° from the normal neutral or rest position of said one cutting edge.

8. A device according to claim 1, wherein said guide means is angularly displaceable through a maximum permissible angle of approximately 60° in opposite direction from a neutral position for enabling the three cutting edges of said wire to generate a cylindrical profile.

* * * * *